(12) United States Patent
Hiller et al.

(10) Patent No.: US 10,755,872 B2
(45) Date of Patent: Aug. 25, 2020

(54) GENERATOR SWITCH WITH A COOLING DEVICE

(71) Applicant: ABB Power Grids Switzerland AG, Baden (CH)

(72) Inventors: Andreas Hiller, Nussbaumen (CH); Philipp Ganter, Klettgau (DE); Jean-Claude Mauroux, Suhr (CH)

(73) Assignee: ABB Power Grids Switzerland AG, Baden (CH)

( * ) Notice: Subject to any disclaimer, the term of this patent is extended or adjusted under 35 U.S.C. 154(b) by 0 days.

(21) Appl. No.: 16/179,321

(22) Filed: Nov. 2, 2018

(65) Prior Publication Data
US 2019/0074144 A1 Mar. 7, 2019

Related U.S. Application Data

(63) Continuation of application No. PCT/EP2017/058985, filed on Apr. 13, 2017.

(30) Foreign Application Priority Data

May 2, 2016 (EP) .................................... 16167941

(51) Int. Cl.
*H01H 9/52* (2006.01)
*F28D 15/04* (2006.01)
(Continued)

(52) U.S. Cl.
CPC .............. *H01H 9/52* (2013.01); *F28D 15/04* (2013.01); *F28D 15/06* (2013.01); *H01B 7/29* (2013.01);
(Continued)

(58) Field of Classification Search
CPC ........................... H01H 9/52; H01H 2009/523
See application file for complete search history.

(56) References Cited

U.S. PATENT DOCUMENTS 3,962,529 A * 6/1976 Kubo ....................... H01B 7/29
174/15.6
7,253,379 B2 8/2007 Lakner et al.
(Continued)

FOREIGN PATENT DOCUMENTS

CN 101248500 8/2008
CN 102592866 7/2012
(Continued)

OTHER PUBLICATIONS

Chinese Office Action, Counter Chinese Appln. Serial No. 201780027684.6, dated Sep. 20, 2019, 9 pgs.

*Primary Examiner* — Mukundbhai G Patel
(74) *Attorney, Agent, or Firm* — Sage Patent Group

(57) ABSTRACT

A generator switch including an encapsulation lying at ground potential and an electrical conductor arranged in an insulated fashion inside the encapsulation and at high-voltage potential, as well as a gravity-driven cooling device having an evaporator and a condenser arranged above the evaporator and a coolant. The cooling device is formed as a closed loop-type coolant circuit. During operation of the generator switch, a level of the liquid coolant in the line system in a static cooling device is at least as high as the upper end of the insulating section in the insulator.

18 Claims, 5 Drawing Sheets

(51) Int. Cl.
*F28D 15/06* (2006.01)
*H01B 7/29* (2006.01)
*H02G 5/10* (2006.01)

(52) U.S. Cl.
CPC . *H01H 2009/523* (2013.01); *H01H 2009/526* (2013.01); *H02G 5/10* (2013.01)

(56) References Cited

U.S. PATENT DOCUMENTS

| | | |
|---|---|---|
| 7,771,114 B2 | 8/2010 | Kiefer et al. |
| 2013/0025818 A1* | 1/2013 | Lyon ................. H05K 7/20781 165/11.1 |
| 2013/0319024 A1* | 12/2013 | Fischer-Carne .... F28D 15/0266 62/119 |
| 2015/0047372 A1* | 2/2015 | Kaufmann ............... H01H 9/52 62/62 |

FOREIGN PATENT DOCUMENTS

| | | |
|---|---|---|
| CN | 102592866 A | 7/2012 |
| EP | 0184146 A1 | 6/1986 |
| EP | 1657731 A1 | 5/2006 |
| EP | 1737009 A1 | 12/2006 |
| FR | 2604028 A1 | 3/1988 |
| JP | S5621457 U | 2/1981 |
| WO | 2013139666 A1 | 9/2013 |
| WO | 2014048680 A1 | 4/2014 |

* cited by examiner

GENERATOR SWITCH WITH A COOLING DEVICE

TECHNICAL FIELD

The present invention relates to a generator switch according to the precharacterizing clause of patent claim 1.

Generator switches with cooling devices for cooling electrical conductors which are at high-voltage potential use the advantageous properties of a coolant/working medium which can absorb a large amount of heat during transition into the vapor phase. The cooling device has an evaporator, which is thermally conductively connected to the electrical conductor and is at high-voltage potential during operation, and a condenser which is at ground potential, as well as a line system, through which condensed liquid coolant is conveyed from the condenser to the evaporator and coolant vapor (coolant in vapor form) is conveyed from the evaporator to the condenser. Furthermore, the cooling device as an insulator, which is used to convey liquid coolant and coolant vapor and serves to separate the ground and high-voltage potentials. Since the coolant is exposed to strong electric fields when it passes through the insulator, the coolant is a fluid with a high dielectric stress-bearing capacity, for instance a liquid based on a fluorinated hydrocarbon, hydrofluoroether, for example "HFE-7100" from the company 3M, ammonia or acetone.

PRIOR ART

A generator switch with a cooling device, of the type mentioned in the introduction, is disclosed for example in EP 1 657 731 B2 or WO 2014/048680 A1. The cooling device known therefrom has a heat pipe, in which the liquid and vapor phases of the coolant are moved in a single container between an evaporator and condenser. The thermal efficiency of such a cooling device is relatively low. Furthermore, this device requires an auxiliary gas with a high dielectric stress-bearing capacity, such as air, nitrogen or sulfur hexafluoride, of which the filling level, like the filling level of the coolant, needs to be monitored.

SUMMARY OF THE INVENTION

The object of the invention, as specified in the patient claims, is to provide a generator switch of the type mentioned in the introduction, the cooling device of which is distinguished by a high efficiency and a high operational reliability.

This object is achieved in a basic embodiment in that the generator switch has an encapsulation which is at ground potential during operation of the generator switch, and an electrical conductor (5) which is arranged in an electrically insulated fashion inside the encapsulation and is at high-voltage potential during operation of the generator switch.

The term "high-voltage" is intended to mean an electrical conductor loaded with a high voltage and/or heavy currents. The rated voltages may be up to several hundreds of kilovolts. Typical values of the rated voltage are however, for example, generally between a few kilovolts and a few tens of kilovolts, with rated currents of the order of several tens of kiloamperes. The evaporator 10 is therefore at high-voltage potential. The condenser, on the other hand, is at ground potential or at most at a potential which is at least an order of magnitude lower in comparison with the evaporator, at most a few kilovolts. The entire high voltage therefore largely drops off at the insulating section of the insulator. The encapsulation of a generator switch can also be arranged electrically insulated from the actual ground potential. Such an embodiment is nevertheless to be comprised by the term "ground potential" hereafter, in that its voltage potential is merely a few kilovolts.

Depending on the generator switch, the insulator itself may be connected to the encapsulation (i.e. it may be at ground potential) or it may be connected to the electrical conductor (i.e. it may be at high-voltage potential).

The generator switch furthermore has a gravity-driven cooling device having an evaporator and a condenser arranged above the evaporator and a coolant. The term "above" is in this case intended to mean a height offset in a direction opposite to the direction in which gravity acts. The evaporator is furthermore thermally conductively connected to the electrical conductor at high-voltage potential during operation of the generator switch. The condenser is connected to the encapsulation, i.e. to the housing of the generator switch, and is therefore at ground potential during operation of the generator switch. The evaporator is connected to the condenser by means of a line system having an insulator, so that during operation of the generator switch coolant vapor can be conveyed from the evaporator to the condenser and liquid coolant can be conveyed from the condenser to the evaporator. The insulator has a dielectric insulating section with an upper end. The line system has a coolant line, which connects a coolant outlet of the condenser to a coolant inlet of the evaporator, and a coolant vapor line which connects a coolant vapor outlet of the evaporator to a coolant vapor inlet of the condenser, in such a way that a closed loop-type coolant circuit ("closed loop-type thermosiphon") is formed. During operation of the generator switch, a level of the liquid coolant in the line system in a static cooling device is at least as high as the upper end of the insulating section in the insulator. The term "upper end" is in this case intended to mean an end of the insulating section in the insulator which faces toward the condenser.

A hydrofluorocarbon, for example "R-245fa" from the company Honeywell, or a hydrofluoroolefin, for example "R-1233 zd (E)" from the company Honeywell is used as the coolant. A mixture of the two coolants is also suitable for this purpose.

The insulator has an in the polymeric, optionally filler- or fiber-reinforced insulating body, which is for example made of a casting resin. As an alternative thereto, the insulator may have a ceramic insulating body. Depending on the embodiment, the insulating body contains epoxide, that is to say an epoxy resin. Such insulators make it easier to incorporate connecting pieces for connecting the insulator to the coolant line and the coolant vapor line. In other embodiments, the insulator may be produced by means of pressure gelling methods/APG (automatic pressure gelling), injection molding of a thermoplastic material or a casting process, for example vacuum casting.

One great advantage of the generator switch with such a cooling device is that it merely requires a coolant as the working medium, but no longer an additional auxiliary gas. This coolant is conveyed in its vapor phase between the evaporator and condenser in a coolant vapor line, which is independent of a coolant line in which the condensed coolant flows back in its liquid phase from the condenser to the evaporator. The coolant flowing back into the evaporator in the liquid state is conveyed separately from the coolant vapor rising into the condenser, so that on the one hand it is possible to reliably avoid the rising coolant vapor being cooled down by coolant flowing back before entering the condenser. On the other hand, the arrangement in a closed loop-type cooling circuit ensures that the rising coolant vapor does not preheat the coolant flowing back. Compared with conventional heat pipes, these measures lead to a significantly better thermal efficiency.

Since the level of the liquid coolant in the line system in a static cooling device is always at least as high as the upper end of the insulating section in the insulator, the liquid coolant additionally fills the insulating section present in the insulator in the resting state of the cooling device, so that a reduction of the dielectric strength of the insulator is avoided even at low temperatures. The term low temperatures is intended to mean temperatures at which the electrical conductor is not at operating temperature, but substantially at ambient temperature. Correspondingly, a very high operational reliability of the cooling device, and therefore of the generator switch, is thus also achieved.

If necessary, the coolant vapor line is configured to be thermally insulated from the coolant line.

In one geometrically preferred embodiment, the insulator has a portion of the coolant line configured as a first insulating channel and a portion of the coolant vapor line configured as a second insulating channel. Depending on the embodiment, the insulator may also contain two insulator components spatially separated from one another, which optionally are respectively formed as a flexible tube made of an insulating material.

The insulator may advantageously have a portion of the coolant line configured as a first insulating channel and a portion of the coolant vapor line configured as a second insulating channel, and a coolant reservoir which is used to form the coolant level, is kept at the potential of the condenser, and communicates with the two insulating channels, may be provided in the cooling device. The effect achieved by simple means in this configuration of the cooling device is that the coolant floods the evaporator and the insulating section, since the coolant reservoir is indeed at a higher level than the insulating section—i.e. the level of the liquid coolant has at least the same level as the upper end of the insulating section. This is advantageous because only the level of the liquid coolant, which is easy to check, in the cooling reservoir needs to be monitored. Furthermore, the coolant reservoir ensures compensation of any coolant loss over a long period of time.

Depending on the embodiment, the coolant reservoir is arranged in the condenser, and may if necessary have a collecting channel used to gather the condensed coolant vapor.

Geometrically simple cooling devices can be produced when the coolant reservoir is arranged in the coolant line. In one particularly simple embodiment, the coolant reservoir is formed by a pipe section with a diameter which is much greater than the diameter of the rest of the coolant line.

If necessary, the coolant reservoir is connected to the electrical conductor, so that the coolant reservoir (50) is at the high-voltage potential of the electrical conductor.

The insulator may moreover be in one piece or several pieces, irrespective of the embodiment.

In order to ensure optimal usability, the insulator has, for each insulating channel, an insulating body that receives the two insulating channels, and a first connecting piece connected to the electrical conductor and a second connecting piece connected to the condenser. In order to facilitate connectability, the insulator advantageously has an insulating body that receives the two insulating channels, and, for each insulating channel, two connecting pieces. In this case, a first connecting piece of the two connecting pieces is connected to the electrical conductor, for example fixed thereto, and has at least one first coolant vapor connection which can be placed at high-voltage potential and communicates with the second insulating channel, as well as at least one first coolant connection which can be placed at high-voltage potential and communicates with the first insulating channel. Furthermore, the second connecting piece is connected to the condenser and has at least one second coolant vapor connection which can be placed at ground potential and communicates with the first insulating channel, and at least one second coolant vapor connection which can be placed at ground potential and communicates with the second insulating channel. An insulator configured in such a way makes it possible to combine the coolant vapor on the flow path between at least two evaporators and a condenser, or optionally even more than one condenser. The number of components, such as insulators, coolant vapor connections, coolant connections, condensers and line sections, can thereby be reduced significantly. The costs of the cooling device are therefore reduced substantially and its operational reliability is increased considerably because of reduced likelihood of leakage. At the same time, mounting and maintenance of the cooling device are also facilitated.

In particularly production-friendly embodiments of the insulator, the two connecting pieces at the upper and lower ends of the insulating section are made of metal. Depending on the conditions of use, the metal may aluminum, copper, steel (including stainless steel) or alloys thereof, but may also contain nonmetallic materials. For dielectric optimization, the ends led from the outside into the first or second insulating channel are in this case respectively configured as field-control electrodes.

In more complex cooling systems, at least the first connecting piece or the second connecting piece are configured as bifurcating pieces having a multiplicity of coolant vapor connections or a multiplicity of coolant connections, respectively. The first connecting piece may, for example, have at least one line combiner, which is configured at an angle and in which two coolant vapor connections are integrated.

If necessary, the first connecting piece has at least one line bifurcation configured at an angle, for example a Y-shaped geometry, in which the two coolant connections are integrated into the line bifurcation.

If the cooling device cannot be produced with a single evaporator, the evaporator may contain a group of at least two evaporator components, each with at least two connections. The term "evaporator" is in this case meant to mean the overall evaporator. In this case, a first connection of the two connections of a first evaporator component of the at least two evaporator components forms the coolant inlet of the (overall) evaporator, while a first connection of the at least two connections of a second evaporator component of the at least two evaporator components forms the coolant vapor outlet of the (overall) evaporator, and a second connection of the first evaporator component is connected to a second connection of the second evaporator component or to a connections of a third evaporator component of the group.

If, for example, the cooling efficiency of the ambient air during operation of the generator switch is insufficient, the condenser may be configured as a heat exchanger and may have two spaces separated from one another by a thermally conductive wall, of which a first space of the two spaces is part of a primary circuit for the coolant and the coolant vapor and communicates with the coolant outlet and the coolant vapor inlet of the condenser, while the second space of the two spaces is part of a secondary circuit for a heat-storing fluid and has two fluid connections that can be connected to a thermal load. A secondary circuit integrated into the heat exchanger makes it possible to regulate the thermal resistance of the cooling device independently of ambient temperature. The electrical conductor to be cooled can therefore be kept in a straightforward way below a defined limit temperature. The secondary cooling circuit may, for example, be produced with an air flow forced by a fan, or a second coolant cooling circuit. This second coolant cooling circuit may for example be produced with liquid cooling, for instance service water.

If it should be necessary to also separate the primary cooling circuit electrically from the secondary cooling circuit, the thermally conductive wall may be configured to be electrically insulating.

Since the level height of the coolant in the line system in a static cooling device is crucial for the operational reliability of the generator switch, it is advantageous for the cooling device to have a sensor for detecting the level or at least a predefined minimum level height of the coolant (4) in the liquid state—i.e. the liquefied coolant.

To be able to carry out remote diagnosis or remote monitoring of the generator switch, it is advantageous for the sensor to have a network interface for linking into a data network. The sensor can therefore be linked operatively into the data network in such a way that it can perform at least one of the following functions:

a) transmission of status information of the sensor to the data network;

b) execution of an instruction from the data network.

In this case, the data network is in particular a LAN (local area network), a WAN (wide area network) or the Internet. The data network, in particular a global data network, may be a TCP/IP network such as the Internet. The data network may, if required, contain distributed storage units such as, for instance, a cloud (data cloud). In this case, the cloud may be a public or private cloud, a hybrid cloud or a community cloud.

The function a) is, for example, intended to mean transmission of a signal when reaching a predefined minimum level height and/or other predefinable level heights of the coolant. The function b) is intended, for example, to mean switching off and restarting the sensor (reset), calibration values, operating states (on), vital signs, etc.

Such an embodiment may, for example, be used so that an alarm can be sent to the data network when the predefined minimum level height of the coolant is fallen below. If required, the alarm may be received by a monitoring person or a monitoring unit in the form of a signal or a message.

BRIEF DESCRIPTION OF THE DRAWINGS

Exemplary embodiments of the invention will be explained in more detail below with the aid of drawings, in which.

EMBODIMENTS OF THE INVENTION

Figure 1:
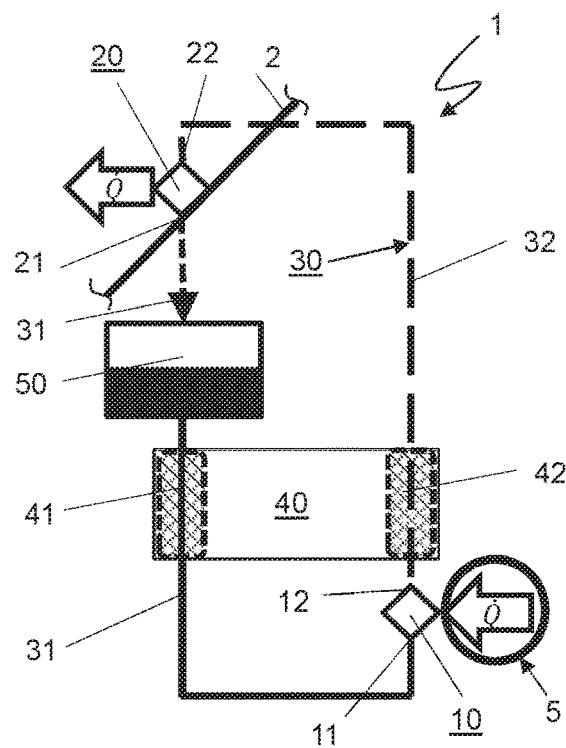
FIG. 1 shows a first embodiment, represented in a very simplified way, of a generator switch with a cooling device according to the invention during operation of the generator switch.
Figure 2:
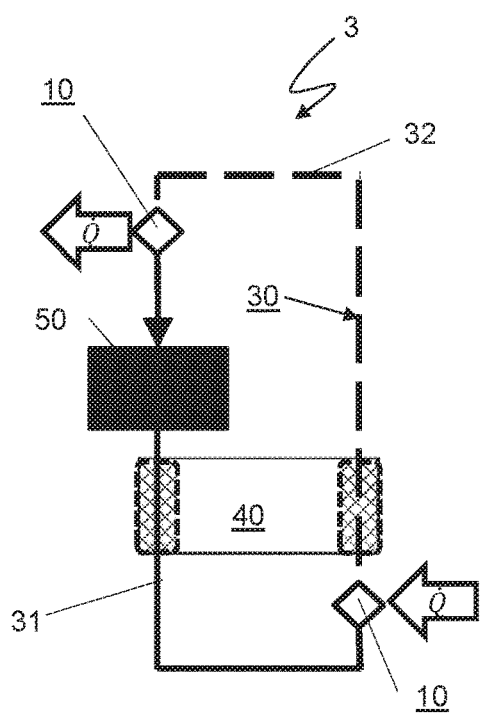
FIG. 2 shows the cooling device according to FIG. 1 during operation and in the case of full filling with a liquid coolant.
Figure 3:
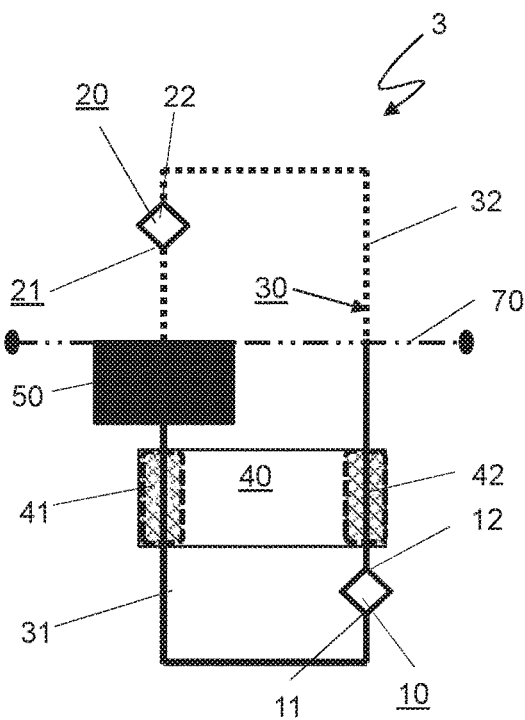
FIG. 3 shows the cooling device according to FIG. 1 in the resting state.
Figure 4:
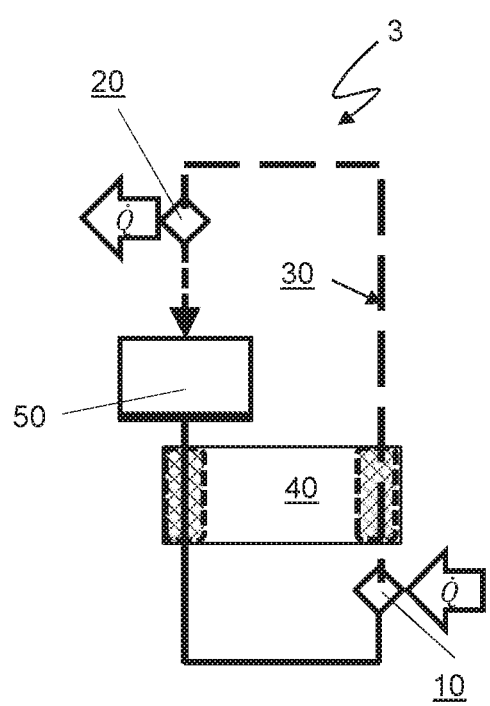
FIG. 4 shows the cooling device according to FIG. 1 during operation and with minimal coolant filling.

In all the figures, references which are the same refer to parts which are the same or at least have the same effect. The first two embodiments of a generator switch 1 with a cooling device 3, which are represented in FIGS. 1 to 6, respectively have an evaporator 10 which is at the high-voltage potential of the electrical conductor 5, a condenser 20 fastened to a ground potential and therefore grounded encapsulation 2 (housing) of the generator switch 1 (only represented in FIG. 1). Furthermore, the first two embodiments of the cooling device as represented in FIG. 1 and FIG. 2 respectively have a line system 30, an insulator 40 which can be loaded with a high voltage, and a coolant reservoir 50. The cooling devices are respectively filled with a liquid coolant. A hydrofluorocarbon in the form of "R-245fa" from the company Honeywell is used as the coolant.

Figure 5:
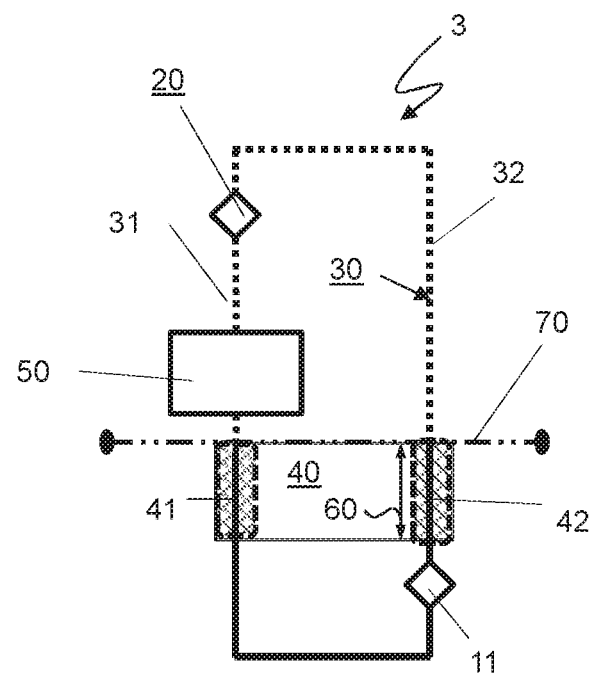
FIG. 5 shows the cooling device according to FIG. 1 in the resting state and with minimal filling with the coolant.
Figures 8, 9:
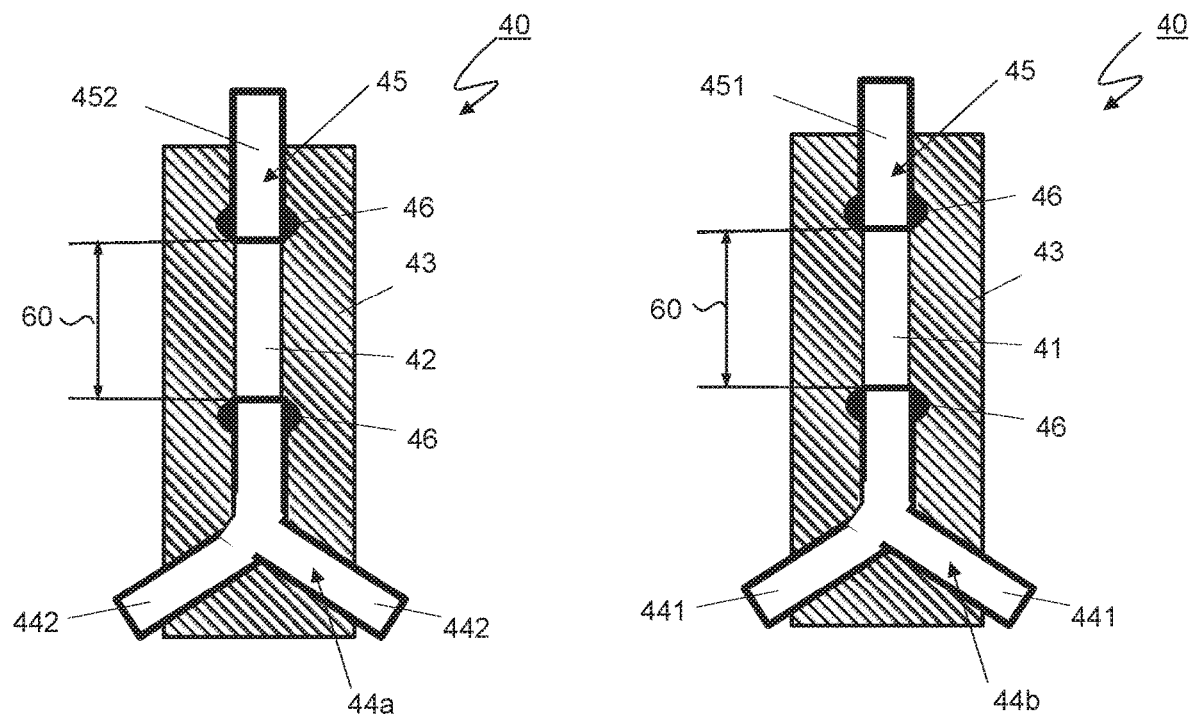
FIG. 8 shows a detail of a first section through an insulator of the cooling device according to FIG. 7.
FIG. 9 shows a detail of a second section through the insulator of the cooling device according to FIG. 7.

In each of the two embodiments, the condenser 20 has a coolant outlet 21, which is connected by means of a coolant line 31, which contains the coolant reservoir 50, of the line system 30 to a coolant inlet 11 of the evaporator 10. A coolant vapor outlet 12 of the evaporator 10 is connected by means of a coolant vapor line 32 of the line system 30 to a coolant vapor inlet 22 of the condenser 20, so that a closed coolant circuit is formed. Two insulating channels 41 and 42 are formed at a distance from one another in the insulator 40. The insulating channel 41 forms a section of the coolant line 31, while the insulating channel 42 forms a section of the coolant vapor line 32. The two insulating channels 41 and 42 are fed substantially parallel to one another through the insulator 40 and have substantially the same length in the flow direction of the coolant or of the coolant vapor, respectively. The two insulating channels respectively define one of two insulating component sections of the insulator 40. Because of minor differences in design and because of the reception of mutually different phases of the coolant/working medium, the two insulating component sections have in different requirements relating to the dielectric strength. The insulating component section with the lower dielectric strength ultimately determines the dielectric properties of the entire insulator 40. This insulating component section is therefore referred to as the insulating section of the insulator 40, and is represented in FIGS. 5, 8 and 9 and denoted by the reference 60. The insulator is formed in one piece and is made of epoxy resin.

During operation of the cooling device, evaporator 10 is in thermally and electrically conductive contact with an electrical conductor L represented in FIG. 1 and loaded with high voltage and heavy currents. These are a few tens of kilovolts with rated currents of the order of several tens of kiloamperes. The evaporator 10 is therefore at high-voltage potential. The condenser 20, on the other hand, is at ground potential or at most at a potential which is at least an order of magnitude lower in comparison with the evaporator 10, at most a few kilovolts. Substantially the entire high voltage therefore drops across the insulating section 60 of the insulator 40.

When carrying rated current, the electrical conductor 5 is heated as a result of ohmic losses, the skin effect and further factors, and releases this heat loss (denoted by an arrow Q) to the evaporator 10. In the evaporator 10, the heat loss is transmitted to the liquid coolant, whereupon the latter evaporates and generates coolant vapor. The coolant vapor (represented by coarse dashes in all the figures) is conveyed by means of the coolant vapor line 32 to the condenser 20. In the condenser 20, the coolant vapor is liquefied. The liquefied coolant (represented by fine dashes in all the figures) flows into the coolant reservoir 50, in which it is collected. From the coolant reservoir 50, the liquid coolant is sent back through the coolant line 31 to the evaporator 10 (this is represented without dashes in all the figures, that is to say with an unbroken line), so that a cycle of the coolant circuit is concluded and begins again. In order to keep the representation of the cooling device as clear as possible, representation of the pipe walls/line walls of the line system 30 has been omitted in almost all the figures.

The cooling device is configured in such a way that the condenser 20 and the coolant reservoir 50 are at a higher level than, i.e. above as seen in the vertical direction, the evaporator 10. This ensures that the liquid coolant enters the evaporator 10 by gravity. It can be seen from all the figures that, during circulation, the coolant vapor is conveyed through the insulating channel 42 and the condensed liquid coolant is conveyed through the insulating channel 41. Since the liquid coolant has a high resistivity, the insulator component section of the insulator, defined by the coolant-filled insulating channel 41, is distinguished by a high dielectric strength. Since the pressure of the coolant vapor during operation of the cooling device is high because of the high vapor temperature, the dielectric strength of the insulator component section defined by the coolant vapor-filled insulating channel 42 is likewise high. These favorable conditions are ensured during operation of the cooling device so long as the evaporator 10 is flushed with liquid coolant (FIGS. 1, 2, 4, 6 and 7).

In the resting state of the cooling device, however, different conditions prevail. In the resting state, although the current in the electrical conductor is interrupted, the insulator 40 may still be loaded with a high voltage. If the coolant reservoir 50 is fully filled (FIGS. 2 and 3), the level 70, denoted in FIG. 3, of the liquid coolant reliably lies above the level of the insulator 40, or of the two insulating channels 41 and 42, which are then fully filled with liquid coolant.

If, however, there is only a relatively small amount of liquid coolant in the cooling device (FIGS. 4 and 5), the level 70 likewise falls significantly. In the resting state of the cooling device, the liquid coolant is at a temperature which is far below the temperature which occurs during rated-current loading. The cool coolant vapor is present in all those sections of the coolant line 31 and of the coolant vapor line 32 which are free of liquid coolant, and is represented in FIG. 5 by dots/points. Because of the low coolant temperature, adapted to the ambient temperature, only the saturation vapor pressure of the coolant acts in the lines 31 and 32. Depending on the surroundings, this pressure may be very low. If the level 70 of the cooling liquid were to lie below the level of the insulating section 60, saturated coolant vapor with a low vapor pressure would be present in one of the two insulating channels 41, 42, which according to Paschen's law could lead to dielectric failure of the insulating section 60 even with a relatively low voltage. It is important to avoid this. The level 70 of the liquid coolant is therefore monitored, particularly in the resting stage. This ensures that the level 70 of the liquid coolant 4 in the line system 30 in a static cooling device 3 is always at least as high as an upper end 61 of the insulating section 60 in the insulator 40.

Figure 6:
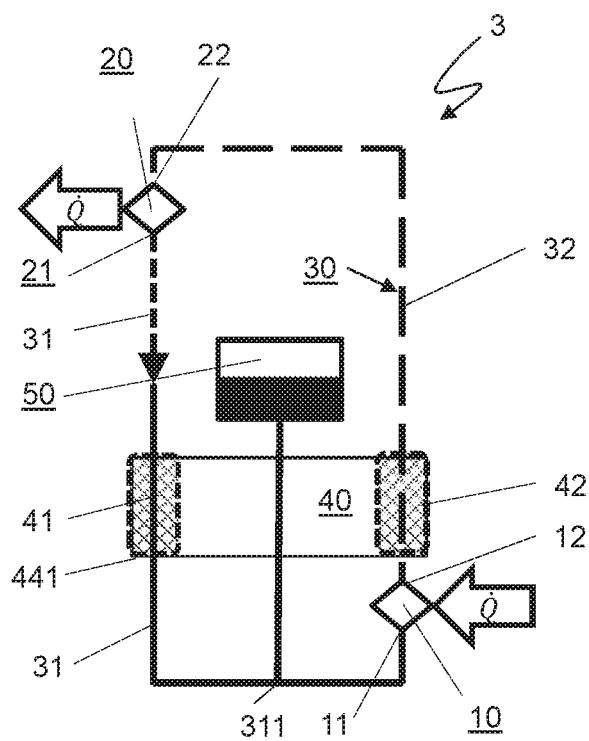
FIG. 6 shows a second embodiment of the cooling device according to the invention.

In the embodiment of the cooling device according to FIG. 6, the coolant reservoir 50 is placed at high-voltage potential during operation. Expressed in other words, in this embodiment the coolant reservoir 50 is connected to the electrical conductor 5, for example directly fastened thereto, so that an optimal thermal transition from the electrical conductor 5 to the evaporator 10 is produced. This is achieved with a line bifurcation 311, which is arranged in the coolant line 31, and on the one hand connects a coolant connection 441 of the insulator 40 to the coolant inlet 11 of the evaporator, and on the other hand has a line branch which communicates with the coolant reservoir 50. Of course, it is not in this case necessary that the feeding from the line bifurcation 311 to the coolant reservoir 50 must take place through the insulator 40.

This has been schematically represented in this way in FIG. 6 merely for the sake of better clarity.

Figure 7:
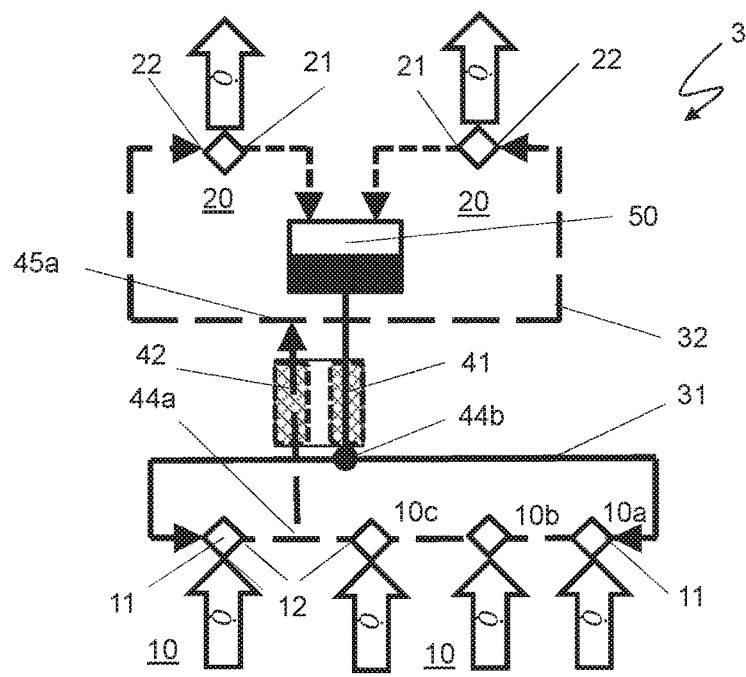
FIG. 7 shows a third embodiment of the cooling device according to the invention.

The third embodiment of the cooling device according to the invention, which is represented in FIG. 7, is constructed according to the first two embodiments, but has two evaporators 10 instead of only one evaporator and two condensers 20 instead of only one condenser. As revealed by FIG. 7, the right-hand one of these two evaporators has a group of three evaporator components 10a, 10b, 10c connected in series. Of these evaporator components, the evaporator component 10a forms the coolant inlet 11 and the evaporator component 10c forms the coolant vapor outlet 12 of this evaporator. In this embodiment of the cooling device according to the invention, the coolant vapor outlets 12 of the two evaporators 10 are connected to a line combiner 44a, which contains two coolant vapor connections 442 of the insulator 40, which can be seen in FIG. 8. The line combiner 44a is fed into the insulating channel 42, which for its part is connected to a line bifurcation 45a of the coolant vapor line 32, the two branches of which are respectively connected to one of the two coolant vapor inlets 22 of the two condensers 20. The two coolant outlets 21 of the two condensers 20 are connected to the coolant reservoir 50, which acts as a line combiner and collection space. The outlet of the coolant reservoir 50 communicates via the insulating channel 41 with a line bifurcation 44b of the coolant line 31, the two branches of which are respectively led to one of the two coolant inlets 11 of the two evaporators 10.

Because of the multiplicity of evaporator components 10a, 10b, 10c, and because of the liquid coolant fed directly into the evaporator 10 via the coolant line 31, and because of the removal of the coolant vapor taking place in the coolant vapor line 32 without interaction with the condensed liquid coolant, such an evaporator is distinguished by a particularly high efficiency.

In this embodiment of the cooling device according to the invention, the line system with the coolant line 31 and the coolant vapor line 32 conveys a particularly large amount of coolant. In order to keep the performance high in this embodiment and all other embodiments of the cooling device, the flow cross section of the coolant line 31 is therefore advantageously dimensioned to be smaller than the flow cross section of the coolant vapor line 32.

FIG. 8 shows a section through an embodiment, represented in a simplified way, of the insulator 40, the section being taken lengthwise along the insulating channel 42. As revealed by FIG. 8, the the insulator 40 has a polymeric, optionally filler- or fiber-reinforced insulating body, which is for example made of a casting resin. As an alternative thereto, the insulator 40 has a ceramic insulating body 43. As revealed by FIG. 8, the insulating channel 42 as well as two connecting pieces 44 and 45 are formed in the insulating body. The connecting piece 44 can be fixed to the electrical conductor and contains two coolant vapor connections 442, which can be placed at high-voltage potential, which fluidically communicate with the insulating channel 42, and which are part of the line combiner 44*a*, which for reasons of flow technology is configured here at an angle. The connecting piece 45 is connected to the condenser 20, and has a coolant vapor connection 452 which can be placed at ground potential and fluidically communicates with the insulating channel 42. Although this coolant vapor connection 452 is not represented in an angled configuration in FIG. 8, like the line combiner 44*a*, it is nevertheless configured in such a way since it can be used in the line bifurcation 45*a* depicted as being at an angle.

The insulator 40 represented in FIG. 9 is configured according to the insulator 40 represented in FIG. 8 Accordingly, the insulating channel 41 and two coolant connections 441 provided in the connecting piece 44 are formed in the insulating body 43. In contrast to the insulator 40 according to FIG. 8, a coolant connection 451, which is configured as an unbifurcated line section and is connected to the coolant reservoir 50, is provided as the connecting piece 45.

In a cooling device with only one evaporator 10, instead of two coolant vapor connections 442 only one coolant vapor connection is provided, as is the case in the embodiments according to FIGS. 1 to 6.

The aforementioned insulator connections are generally made of metal, and are respectively led from the outside into the insulating channels 41 and 42. The ends, led into the insulating channels, of the connections, for example of the coolant vapor connection 452, are respectively configured as field control electrodes 46.

Figure 10:
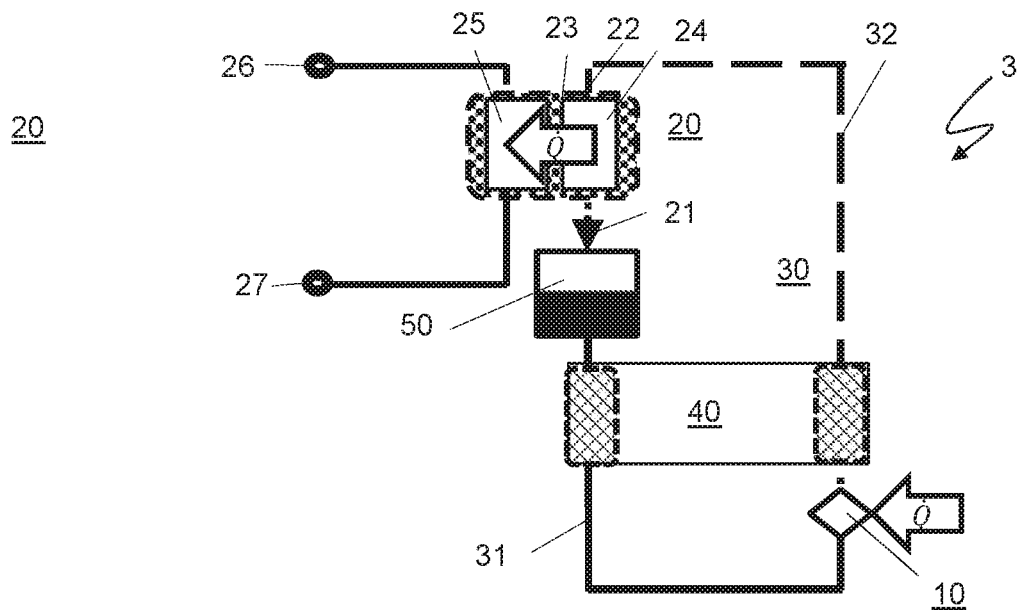
FIG. 10 shows a view of the embodiment of the cooling device according to FIG. 1, in which the condenser is configured as a heat exchanger with a primary circuit and a secondary circuit.

FIG. 10 reveals that the condenser 20 may be configured as a heat exchanger and has two spaces 24, 25 separated from one another by a thermally conductive wall 23. The first space 24 is part of a primary circuit for the coolant and the coolant vapor, and communicates with the coolant outlet 21 and the coolant vapor inlet 22 of the condenser 20. The second space, on the other hand, is part of a secondary circuit for a heat-storing fluid, and has two connections 26, 27 that can be connected to a thermal load.

Such a cooling device is distinguished by high dielectric reliability, chemical stability and a low leakage rate. Furthermore, it is substantially maintenance-free and has a low thermal resistance. At the same time, it can be used in a widely extended temperature range and is only dependent on the properties of the liquid coolant in the primary circuit. The cooling device is furthermore independent of ambient air and is distinguished by high thermal dissipation, or cooling power. This furthermore allows a modular structure of the cooling device and ensures effective use of waste heat in an OCR circuit, a heater or a chemical process.

The operational reliability of such a cooling device may be additionally increased when the thermally conductive wall 23 is configured to be electrically insulating.

Figure 11:
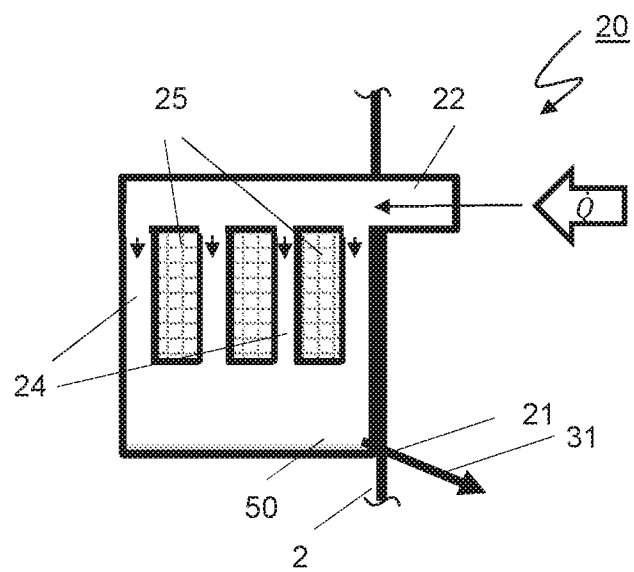
FIG. 11 shows a view in section through one embodiment of the heat exchanger according to FIG. 10, into which the coolant reservoir is incorporated.

FIG. 11 represents an exemplary design structure of a condenser 20 configured as a heat exchanger. FIG. 11 reveals that the heat exchanger is fitted to an easily accessible outer side of the encapsulation 2. Through the coolant vapor connection 22, during operation of the cooling device, coolant vapor flows into the space 24 and condenses on the thermally conductively configured walls of heat transmission elements of the secondary circuit. The heat loss Q given off during the condensation is transmitted to a heat carrier of a secondary circuit which flows through the space 25, typically water or oil, and is released through the encapsulation 2 to a load (not represented in detail in FIG. 11). The cooling power achieved by the heat carrier may be regulated so that the electrical conductor to be cooled is kept at a predetermined setpoint temperature independently of perturbing variables, such as the ambient conditions.

The condensed coolant is collected in the coolant reservoir 50 integrated into the heat exchanger, and is fed through the encapsulation into the coolant circuit.

Since the heat exchanger is fitted externally on the encapsulation 2, it can easily be incorporated into the cooling device and also easily removed again therefrom.

Figure 12:
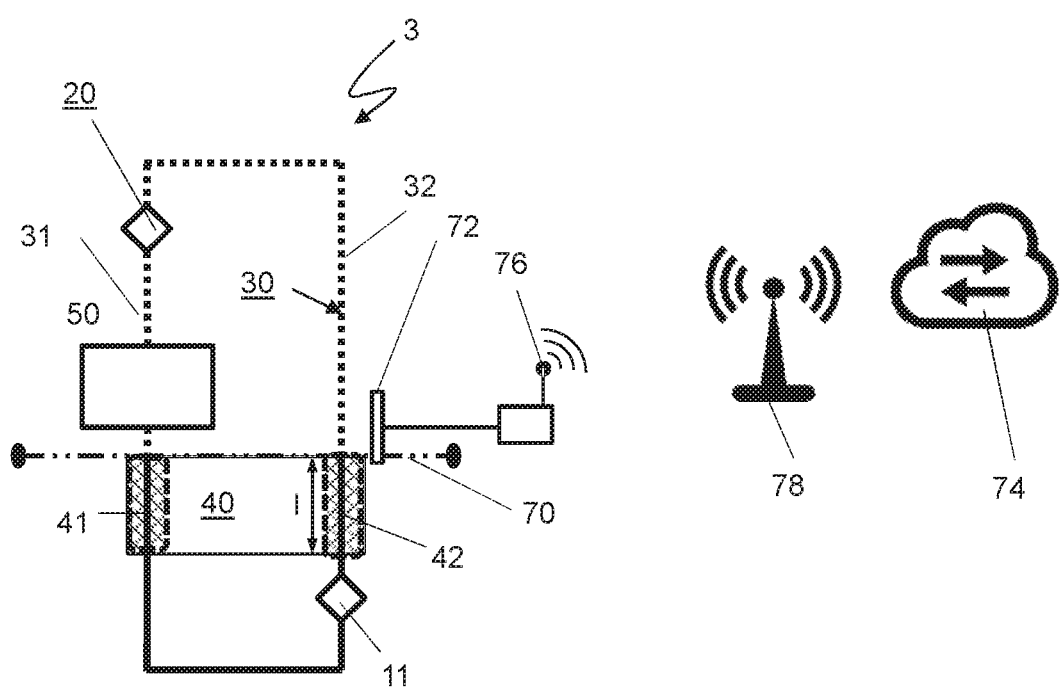
FIG. 12 shows a view of the cooling device according to FIG. 5, which is furthermore provided with a sensor for detecting the liquid coolant level, so that the sensor can communicate with a data network.

The view of the cooling device as represented in FIG. 12 is based on the first embodiment, which is also explained with reference to FIG. 5 above in this description. Only the differences of the embodiment shown in FIG. 12 from the embodiment shown in FIG. 5 will be explained below.

Since the level height of the coolant in the line system in a static cooling device is crucial for the operational reliability of the generator switch, the cooling device 3 has a sensor 72 for detecting the level 70 or at least a predefined minimum level height of the coolant 4 in the liquid state. The sensor 72 has a network interface and is connected thereby to a transmitter/receiver 76, so that the sensor 72 can communicate via a transmission network 78 to an Internet-based data network 74 containing a cloud. When the predefined minimum level height of the coolant 4 in the cooling device 3 is fallen below, an alarm in the form of a signal is therefore sent to the data network.

Although the aforementioned embodiment has been explained in connection with FIG. 12, it may likewise be used as appropriate for all embodiments disclosed in this document.

LIST OF REFERENCE SIGNS

1 generator switch
2 encapsulation, housing of the generator switch
3 cooling device
4 coolant
5 electrical conductor (at high-voltage potential)
10 evaporator
10*a*, 10*b*, 10*c* evaporator component
11 coolant inlet
12 coolant vapor outlet
20 condenser
21 coolant outlet
22 coolant vapor inlet
23 thermally conductive wall
24, 25 spaces
26, 27 connections
30 line system
31 coolant line
311 line bifurcation 32 coolant vapor line
40 insulator
41, 42 insulating channels
43 insulating body
44, 45 connecting pieces
44a line combiner
44b, 45a line bifurcation
441 coolant connection
442 coolant vapor connection
451 coolant connection
452 coolant vapor connection
46 field control electrode
50 coolant reservoir
60 insulating section
61 upper end of the insulating section
70 level of the coolant
72 sensor, level sensor
74 data network
76 transmitter/receiver
78 transmission network
Q heat loss

The invention claimed is:

1. A generator switch, comprising
an encapsulation which is at ground potential during operation of the generator switch,
an electrical conductor which is arranged in an electrically insulated fashion inside the encapsulation and is at high-voltage potential during operation of the generator switch, a gravity-driven cooling device having an evaporator and a condenser arranged above the evaporator and further having a coolant, wherein the evaporator is thermally conductively connected to the electrical conductor and is therefore at high-voltage potential during operation of the generator switch, and wherein the condenser is connected to the encapsulation and is therefore at ground potential during operation of the generator switch,
wherein the evaporator is connected to the condenser by means of a line system having an insulator, so that during operation of the generator switch coolant vapor can be conveyed from the evaporator to the condenser and liquid coolant can be conveyed from the condenser to the evaporator,
wherein the insulator has an insulating section with an upper end,
wherein the line system has a coolant line, which connects a coolant outlet of the condenser to a coolant inlet of the evaporator, and furthermore has a coolant vapor line which connects a coolant vapor outlet of the evaporator to a coolant vapor inlet of the condenser, in such a way that a closed loop-type circuit is formed,
in that, during operation of the generator switch, a level of the liquid coolant in the line system with the cooling device in a static condition is at least as high as the upper end of the insulating section in the insulator,
wherein the insulator has a portion of the coolant line configured as a first insulating channel and a portion of the coolant vapor line configured as a second insulating channel, and
wherein the insulator has an insulating body that receives the two insulating channels, and, for each insulating channel, a first connecting piece connected to the electrical conductor and a second connecting piece connected to the condenser.

2. The generator switch as claimed in claim 1, wherein the coolant vapor line is configured to be thermally insulated from the coolant line.

3. The generator switch as claimed in claim 1, wherein a coolant reservoir is arranged in the condenser.

4. The generator switch as claimed in claim 1, wherein a coolant reservoir is arranged in the coolant line.

5. The generator switch as claimed in claim 1, wherein a coolant reservoir is connected to the electrical conductor, so that the coolant reservoir is at the high-voltage potential of the electrical conductor.

6. The generator switch as claimed in claim 1, wherein the first connecting piece is arranged at the lower end of the insulating section and the second connecting piece is arranged at the upper end of the insulating section, and they are made of metal, and in that their ends led from the outside into the first or second insulating channel are respectively configured as field-control electrodes.

7. The generator switch as claimed in claim 1, wherein at least the first connecting piece or the second connecting piece are configured bifurcating pieces having a multiplicity of coolant vapor connections or a multiplicity of coolant connections, respectively.

8. The generator switch as claimed in claim 1, wherein the evaporator contains a group of at least two evaporator components, each with at least two connections,
wherein a first connection of the two connections of a first evaporator component of the group of evaporator components forms the coolant inlet of the evaporator, wherein a first connection of the at least two connections of a second evaporator component of the group of evaporator, and
wherein a second connection of the first evaporator component is connected to a second connection of the second evaporator component or to a connections of a third evaporator component of the group of evaporator components.

9. The generator switch as claimed in claim 1, wherein the condenser is configured as a heat exchanger and has two spaces separated from one another by a thermally conductive wall, on which a first space of the two spaces is part of a primary circuit for the coolant and the coolant vapor communicates with the coolant outlet and the coolant vapor inlet of the condenser, while the second space of the two spaces is part of a secondary circuit for a heat-storing fluid and has two fluid connections that can be connected to a thermal load.

10. The generator switch as claimed in claim 9, wherein the thermally conductive wall is configured to be electrically insulating.

11. The generator switch as claimed in claim 1, wherein the cooling device has a sensor for detecting the level or at least a predefined minimum level height of the coolant in the liquid state.

12. The generator switch as claimed in claim 11, wherein the sensor has a network interface for linking into a data network, so that the sensor can be linked operatively into the data network in such a way that it can perform at least one of the following functions:
a) transmission of status information of the sensor to the data network;
b) execution of an instruction from the data network;
wherein the data network is in particular a LAN, a WAN or the Internet.

13. The generator switch as claimed in claim 12, wherein an alarm can be sent to the data network when the predefined minimum level height of the coolant is fallen below.

14. The generator switch as claimed in claim 2, wherein the insulator has an insulating body that receives the two insulating channels, and, for each insulating channel, a first connecting piece connected to the electrical conductor and a second connecting piece connected to the condenser.

15. The generator switch as claimed in claim 14, wherein the evaporator contains a group of at least two evaporator components, each with at least two connections,
   wherein a first connection of the two connections of a first evaporator component of the group of evaporator components forms the coolant inlet of the evaporator, wherein a first connection of the at least two connections of a second evaporator component of the group of evaporator, and
   wherein a second connection of the first evaporator component is connected to a second connection of the second evaporator component or to a connections of a third evaporator component of the group of evaporator components.

16. The generator switch as claimed in claim 15, wherein the condenser is configured as a heat exchanger and has two spaces separated from one another by a thermally conductive wall, on which a first space of the two spaces is part of a primary circuit for the coolant and the coolant vapor and communicates with the coolant outlet and the coolant vapor inlet of the condenser, while the second space of the two spaces is part of a secondary circuit for a heat-storing fluid and has two fluid connections that can be connected to a thermal load.

17. The generator switch as claimed in claim 16, wherein the cooling device has a sensor for detecting the level or at least a predefined minimum level height of the coolant in the liquid state.

18. The generator switch as claimed in claim 17, wherein the sensor has a network interface for linking into a data network, so that the sensor can be linked operatively into the data network in such a way that it can perform at least one of the following functions:
   a) transmission of status information of the sensor to the data network;
   b) execution of an instruction from the data network;
   wherein the data network is in particular a LAN, a WAN or the Internet.

* * * * *